United States Patent [19]
Tanaka et al.

[11] Patent Number: 5,313,196
[45] Date of Patent: May 17, 1994

[54] METHOD AND APPARATUS FOR DRIVING A DISPLAY DEVICE

[75] Inventors: Hiroshi Tanaka, Higashiosaka; Kaoru Nakanishi, Izumisano, both of Japan

[73] Assignee: Sharp Kabushiki Kaisha, Osaka, Japan

[21] Appl. No.: 757,333

[22] Filed: Sep. 10, 1991

[30] Foreign Application Priority Data

Sep. 17, 1990 [JP] Japan .................................. 2-247846

[51] Int. Cl.⁵ .............................................. G09G 3/00
[52] U.S. Cl. ...................................... 345/147; 345/210
[58] Field of Search ................. 340/793, 805, 874 BL, 340/703; 358/455, 456, 457, 458, 459

[56] References Cited

U.S. PATENT DOCUMENTS

| | | | |
|---|---|---|---|
| 4,779,083 | 10/1988 | Ishii et al. | 340/793 |
| 4,956,638 | 9/1990 | Larky et al. | 340/793 |
| 5,023,603 | 6/1991 | Wakimoto et al. | 340/793 |

Primary Examiner—Ulysses Weldon
Assistant Examiner—Matthew Luu
Attorney, Agent, or Firm—David G. Conlin; George W. Neuner

[57] ABSTRACT

When performing gradation display by giving digital value as display data to each pixel arranged in a matrix on a display panel and emitting the pixels at a brightness corresponding to the magnitude of the digital value, plural display frame periods are set as one cycle, and digital value $\alpha$ is given as display data in certain display frames selectively determined in the cycle, and digital value $\beta = \alpha \pm M$ (M being a positive Integer) is given as display data in, other display frames in the same cycle. Accordingly, a halftone gradation between the gradation corresponding to the digital value $\alpha$ and the gradation corresponding to the digital value $\beta$ may be displayed in plural degrees depending on the rate of the number of display frames given the digital value $\alpha$ and the number of display frames given the digital value $\beta$.

4 Claims, 3 Drawing Sheets

METHOD AND APPARATUS FOR DRIVING A DISPLAY DEVICE

BACKGROUND OF THE INVENTION

1. Field of the Invention

The present invention relates to a method and apparatus for driving a display device such as liquid crystal display, plasma display, EL display and LED display.

2. Description of the Prior Art

Hitherto, for example, for gradation display by a liquid crystal display device of active matrix driving system, analog signals are applied as the display data corresponding to each pixel disposed in matrix on a display panel, and the control voltage of the display panel is varied depending on the magnitude of the analog signal, thereby achieving gradation display.

In other method, digital signals are given as the display data, and the analog voltage corresponding to input digital value is selected, and the selected analog voltage is used as the control voltage of the display panel for gradation display.

In a liquid crystal display apparatus of simple matrix driving system, a frame thinning method is employed for gradation display. In this method, plural display frame periods are determined as one cycle, and depending on the gradation to be displayed, the number of display frames for ON driving of the pixels in the cycle and the number of display frames for OFF driving of the pixels are variably set.

In the case of plural gradation displays by a large liquid crystal display device of 10 inches or larger size by using such conventional method, since the capacity of the electrode becomes large because of the large size of the display panel, when an analog signal is fed as display data, it becomes difficult to drive the electrode by transmitting the analog voltage at high speed.

Or when entering digital value as display data, it is necessary to generate the analog voltage by the number of the digital values, and prepare the changeover circuits for selecting the voltages by the number of pixels per line to be arranged on the display panel, which results in the increase of the circuit scale.

Furthermore, in the case of plural gradation displays by the frame thinning method, in the liquid crystal display device of simple matrix driving system, there is no problem because the response speed is slow, but in the liquid crystal display device of active matrix driving system, the response speed is high, and the flicker is very obvious, and the display grade is extremely lowered.

SUMMARY OF THE INVENTION

It is hence a primary object of the invention to present a method and apparatus for driving a display device capable of displaying plural gradations with less obvious flicker, without increasing the size of the circuit for display driving.

To achieve the above object, the invention presents a method of driving a display device for applying digital values to pixels arranged in matrix on a display panel as corresponding display data, and illuminating the pixels at a brightness corresponding to the magnitude of the digital values, to achieve gradation display, wherein plural display frame periods are set as one cycle, a digital value $\alpha$ is given as display data in several display frames selectively determined within the cycle, and digital data $\beta = \alpha \pm M$ (M being a positive integer) is given as display data in other display frames in the same cycle, and a halftone gradation between the gradation corresponding to the digital value $\alpha$ and the gradation corresponding to the digital value $\beta$ is displayed in plural stage corresponding to the rate of the number of display frames provided with the digital value $\alpha$ and the number of display frames provided with the digital value $\beta$.

According to the invention, the digital value $\alpha$ or digital value $\beta$ is given as display data in each display frame in one cycle, and the gradation of the mean of these digital values, that is, the halftone gradation of the gradation corresponding to the digital value $\alpha$ and the gradation corresponding to the digital value $\beta$ is displayed.

In each display frame, meanwhile, each pixel Is not set either in ON drive or in OFF drive alternatively, but either one of two adjacent gradations is set in display state, and flicker is reduced.

As the above-mentioned, according to the method for driving a display device of the invention, since the digital value $\alpha$ or digital value $\beta$ is given as display data in each display frame in one cycle, and the gradation of the mean of these digital values, that is, the halftone gradation of the gradation corresponding to the digital value $\alpha$ and the gradation corresponding to the digital value $\beta$ is displayed, the displaying of plural gradations can be achieved without increasing the size of the circuit for display driving.

In each display frame, meanwhile, each pixel in not set either in ON drive or in OFF drive alternatively, but either one of two adjacent gradations is set in display state, and flicker is reduced, so that the display grade may be improved.

The invention also presents an apparatus for driving a display device for applying digital values to pixels arranged in matrix on a display panel as corresponding display data, and illuminating the pixels at a brightness corresponding to the magnitude of the digital values to achieve gradation display, comprising:

picture signal generating means for delivering digital display data as picture signal and vertical synchronizing signal for defining one display frame, arithmetic means for performing predetermined calculation on the digital display data from the picture signal generating means, data selecting means for applying either the display data from the picture signal generating means or the data from the arithmetic means to the display device, depending on a selection signal for specifying the digital data to be delivered in one display frame, and selection signal generating means for generating the selection signal on the basis of the vertical synchronizing signal, wherein plural display frames are set as one cycle, and display data is applied to the display device from the picture signal generating means in several display frames selectively determined in one cycle, and the output from the arithmetic means is given to the display device in other display frames in the same cycle.

The invention is characterized in that the arithmetic means is means for subtracting one from the digital display data.

Also the invention is characterized in that the arithmetic means is means for adding one to the digital display data.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
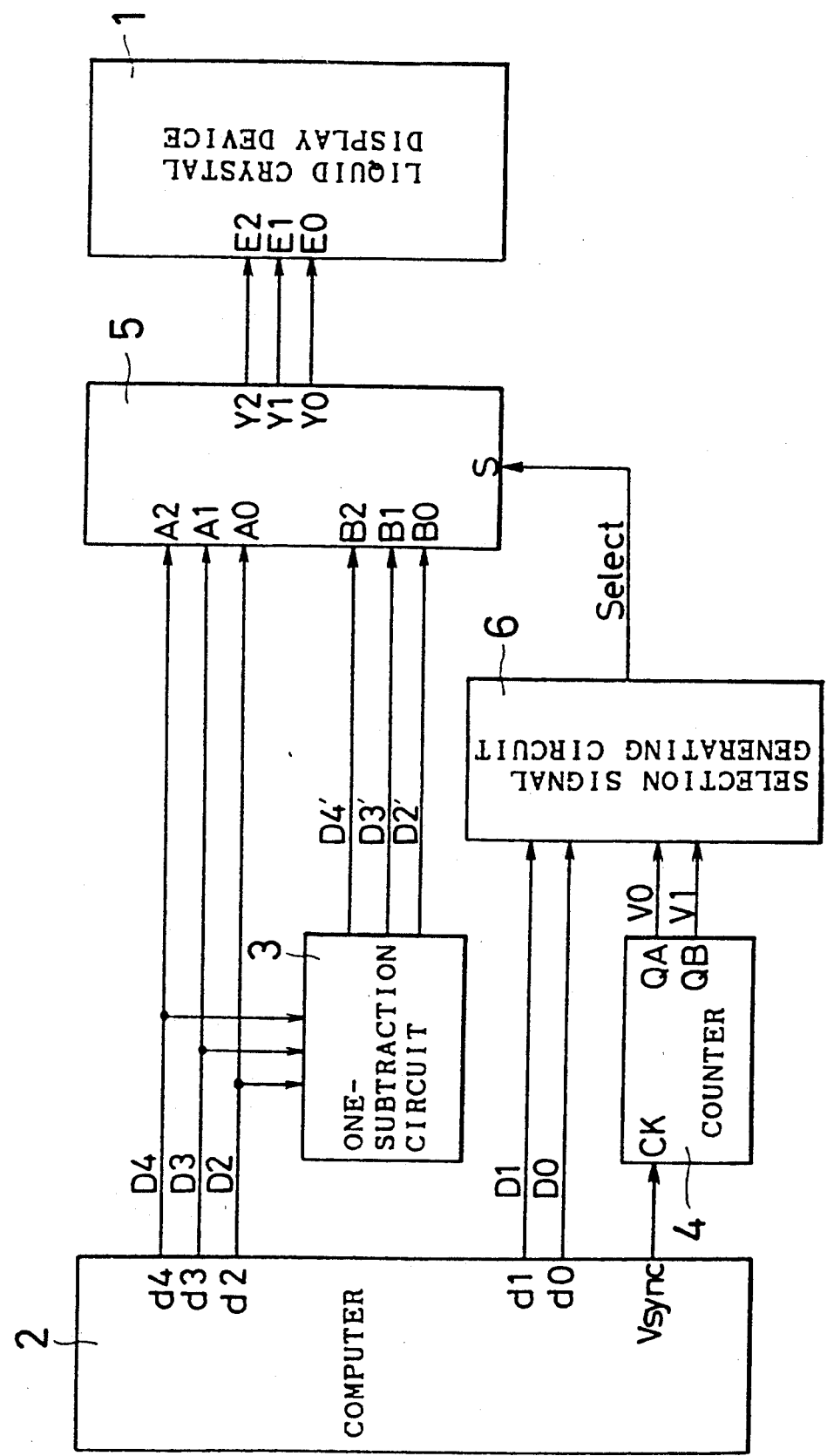
FIG. 1 is a block diagram showing a basic structure of a driving circuit to which a driving method of one of the embodiments of the invention is applied.

Now referring to the drawing, preferred embodiments of the invention are described below.

FIG. 1 is a block diagram showing a composition of a driving circuit for 29 gradation display in a liquid crystal display device 1 of active matrix driving method.

The liquid crystal display device 1 displays, on a display panel not shown in the drawing, by receiving three-bit digital signals at input terminals E2, E1, E0, as display data corresponding to pixels arranged in matrix. The input three-bit digital signal denotes a digital value of 0 to 7, and therefore the liquid crystal display device 1 is equipped with a function for selecting an analog voltage corresponding to each digital value, and emitting the corresponding pixel at a brightness corresponding to that analog voltage.

A computer 2 possesses functions for delivering five-bit digital signals (D4, D3, D2, D1, D0) as video signal corresponding to one of such pixels from output terminals d4, d3, d2, d1, d0, and delivering a vertical synchronizing signal Vsync synchronized with the display period of one screen portion of the display panel described above.

A one-subtraction circuit 3 receives three upper bits (D4, D3, D2) of the video signal delivered from the computer 2, subtracts one from the digital value $\alpha$ expressed by the upper three bits, and delivers the calculated digital value $\beta = \alpha - 1$ as three-bit digital signal (D4', D3', D2') to input terminals B2, B1, B0 of a data selector circuit 5 of the next stage, and this circuit is composed of read-only memory, logic circuit and so on.

The data selector circuit 5 possesses input terminals A2, A1, A0 for directly receiving the upper three bits (D4, D3, D2) of the video signal delivered from the computer 2.

A counter 4 counts the vertical synchronizing signals Vsync delivered from the computer 2, and delivers a synchronizing signal V0 of twice in the period of the vertical synchronizing signal Vsync, and a synchronizing signal V1 of four times in the period to apply these synchronizing signal V0, V1 to a selection signal generating circuit 6 of the next stage, and it is practically realized, for example, by a commercial circuit such as 74LS163.

The selection signal generating circuit 6 delivers a selection signal Select on the basis of the digital signals of lower two bits (D1, D0) of the video signal given from the computer 2, and the synchronizing signal V1, V0 given from the counter 4, and gives to a data selector circuit 5.

The data selector circuit 5 selects and takes in either the three-bit digital signal (D4, D3, D2) given from the computer 2, or the three-bit digital signal (D4', D3', D2') given from the one-subtraction circuit 3, depending on the selection signal Select given from the selection signal generating circuit 6, and delivers from the output terminals Y2, Y1, Y0 as display data to give to the liquid crystal device 1.

The operation of 29-gradation display of the liquid crystal device 1 by thus composed driving circuit is explained below.

The upper three-bit digital signal (D4, D3, D2) of video signal delivered from the computer 2 is directly fed to the input terminals A2, A1, A0 of the data selector circuit 5, and is simultaneously subtracted by one from the digital value $\alpha$ as shown in Table 1 by the one-subtraction circuit 3 to be converted into three-bit digital signal (D4', D3', D2') expressing the subtracted digital value $\beta = \alpha - 1$ to be applied to input terminals B2, B1, B0 of the data selector circuit 5.

TABLE 1

| Input digital data ($\alpha$ value) | | | | One-subtracted data ($\beta$ value) | | | |
|---|---|---|---|---|---|---|---|
| D4 | D3 | D2 | Digital value | D4' | D3' | D2' | Digital value |
| 1 | 1 | 1 | 7 | 1 | 1 | 0 | 6 |
| 1 | 1 | 0 | 6 | 1 | 0 | 1 | 5 |
| 1 | 0 | 1 | 5 | 1 | 0 | 0 | 4 |
| 1 | 0 | 0 | 4 | 0 | 1 | 1 | 3 |
| 0 | 1 | 1 | 3 | 0 | 1 | 0 | 2 |
| 0 | 1 | 0 | 2 | 0 | 0 | 1 | 1 |
| 0 | 0 | 1 | 1 | 0 | 0 | 0 | 0 |
| 0 | 0 | 0 | 0 | 0 | 0 | 0 | *0 |

(*One-subtracted value of 0 is also 0.)

On the other hand, the vertical synchronizing signal Vsync delivered from the computer 2 is counted by the counter 4, and according to the counting, the synchronizing signal V0 of twice in the period of the vertical synchronizing signal Vsync, and the synchronizing signal V1 of four times in the period of the vertical synchronizing signal Vsync are delivered from the counter 4, and these synchronizing signals V0, V1 are fed into the selection signal generating circuit 6.

Figure 2:
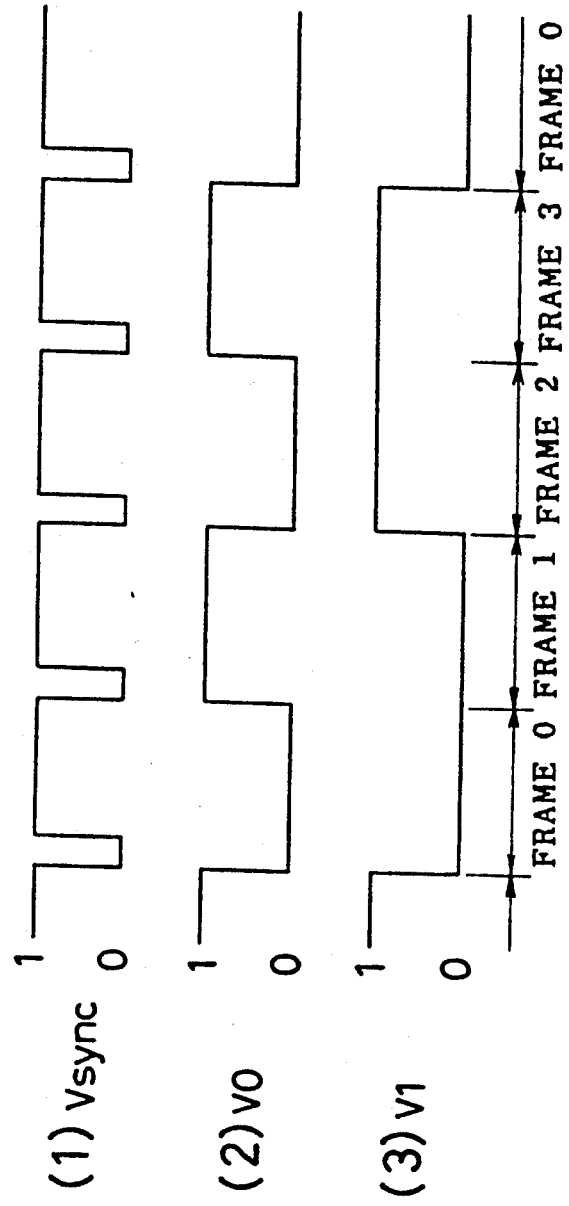
FIG. 2 is a timing chart for showing the relation between each synchronizing signal and display frame in the same driving method.

FIG. 2 is a timing chart showing the corresponding relation of the vertical synchronizing signal Vsync and synchronizing signals V0, V1.

In the selection signal generating circuit 6, according to the synchronizing signals V0, V1 being fed, the period of the vertical synchronizing signal Vsync, that is, the display frame in the display period for one screen of the display panel is discriminated as shown in Table 2.

TABLE 2

| V1 | V0 | Frame No. |
|---|---|---|
| 0 | 0 | 0 |
| 0 | 1 | 1 |
| 1 | 0 | 2 |
| 1 | 1 | 3 |

More specifically, in the selection signal generating circuit 6, as shown in FIG. 2, the display frame in the period when both synchronizing signals V0 and V1 are "0" is number 0, the display frame in the period when the synchronizing signal V0 is "1" and the synchronizing signal V1 is "0" is number 1, the display frame in the period when the synchronizing signal V0 is "0" and the synchronizing signal V1 is "1" is number 2, and the display frame in the period when both synchronizing signals V0 and V1 are "1" is number 3, thereby discriminating the display frames. This discrimination is repeated in each cycle of four display frame periods.

In the selection signal generating circuit 6, depending on the digital values of four types expressed by two-bit digital signal (D1, D0) given from the computer 2, either "1" or "0" is selected as the selection signal Select to be delivered in the period of each frame as shown in Table 3.

TABLE 3

|    |    |   | Frame No. |   |   |   |
|----|----|---|-----------|---|---|---|
|    |    |   | 0 | 1 | 2 | 3 |
|    |    | 0 0 | 1 | 0 | 0 | 0 |
| D1 | D0 | 0 1 | 1 | 0 | 1 | 0 |
|    |    | 1 0 | 1 | 1 | 0 | 1 |
|    |    | 1 1 | 1 | 1 | 1 | 1 |

That is, when the two-bit digital signal (D1, D0) is (0, 0), the selection signal Select delivered from the selection signal generating circuit 6 in the period of each display frame of number 0, 1, 2, 3 Is respectively 1, 0, 0, 0, the selection signal Select delivered when the digital signal (D1, D0) is (0, 1) is respectively 1, 0, 1, 0, the selection signal Select delivered when the digital signal (D1, D0) is (1, 0) is respectively 1, 1, 0, 1, and the selection signal Select delivered when the digital signal (D1, D0) is (1, 1) is respectively 1, 1, 1, 1.

In the data selector circuit 5, on the other hand, in the period of the display frame when the selection signal Select given from the selection signal generating circuit 6 is "1" the digital signal (D4, D3, D2) from the computer 2 expressing the digital value $\alpha$ is taken in, and it is given as the display data to the liquid crystal display device 1, and in the period of the display frame when the selection signal Select is "0", the digital signal (D4', D3', D2') from the one-subtraction circuit 3 expressing the digital value $\beta$ is taken in, and it is given as display data to the liquid crystal display device 1.

That is, the liquid crystal display device 1 receives the display data of the digital value as shown in Table 4 in each display frame, depending on the digital value of the lower two-bit digital signal (D1, D0) delivered from the computer 2.

TABLE 4

|    |    |   | Frame No. |   |   |   | |
|----|----|---|---|---|---|---|---|
|    |    |   | 0 | 1 | 2 | 3 | Mean |
|    |    | 0 0 | $\alpha$ | $\beta$ | $\beta$ | $\beta$ | $\alpha - 0.75$ |
| D1 | D0 | 0 1 | $\alpha$ | $\beta$ | $\alpha$ | $\beta$ | $\alpha - 0.5$ |
|    |    | 1 0 | $\alpha$ | $\alpha$ | $\beta$ | $\alpha$ | $\alpha - 0.25$ |
|    |    | 1 1 | $\alpha$ | $\alpha$ | $\alpha$ | $\alpha$ | $\alpha$ |

For example, when the digital signal (D1, D0) is (1, 1) expressing the digital value 3 of the highest position, in one cycle of four display frame periods from frame number 0 to frame number 3, the digital value $\alpha$ is given in each display frame to the liquid crystal display device 1 as display data, and the mean of the display data in this one cycle is $\alpha$. In other words, in the pixels of the display panel corresponding to this display data, the brightness corresponding to the digital value $\alpha$ is obtained in average in this one cycle.

Or when the digital signal (D1, D0) is (1, 0) expressing the digital value 2, in the display frame of frame number 2 in the same one cycle, the digital value $\beta$ is the display data, while the digital value $\alpha$ is the display data in all other three display frame periods, and the mean of the display data in this one cycle is $$(3\alpha + \beta)/4 = (3\alpha + \alpha - 1)/4 \qquad (1)$$
$$= \alpha - 0.25$$

To be more specific, in the pixels, the brightness corresponding to the digital value ($\alpha - 0.25$) in average is obtained in this one cycle. This brightness shows the brightness one degree lower than the brightness of the digital value $\alpha$ when the interval from the brightness corresponding to the digital value $\alpha$ to the brightness corresponding to the digital value $\beta$ one less than the digital value $\alpha$ is divided in four degrees.

Similarly, when the digital signal (D1, D0) is (0, 1) expressing the digital value 1, the same one cycle comprises two periods of the display frame having digital value $\alpha$ as display data, and two periods of the display frame having digital value $\beta$ as display data, and therefore the mean of the display data in this one cycle is $$(2\alpha + 2\beta)/4 = (2\alpha + 2\alpha - 2)/4 \qquad (2)$$
$$= \alpha - 0.5$$

That is, the brightness of pixels at this time is one degree lower than when the mean of the digital value is $\alpha - 0.25$.

Furthermore, when the digital signal (D1, D0) is (0, 0) expressing the digital value 0, in this one cycle, the display frame of having the digital value $\alpha$ as the display data is in one period, while the digital value $\beta$ is used as the display data in the other three display frame period, so that the mean of the display data in this one cycle is $$(\alpha + 3\beta)/4 = (\alpha + 3\alpha - 3)/4 \qquad (3)$$
$$= \alpha - 0.75$$

That is, the brightness of pixels at this time is one degree lower than when the mean of the digital value is $\alpha - 0.5$.

Thus, the brightness of each degree of dividing into four degrees between the brightness corresponding to the digital value $\alpha$ and the brightness corresponding to the digital value $\beta$ one smaller is displayed in a cycle of four display frame periods.

The upper three-bit digital signal (D4, D3, D2) delivered from the computer 2 expresses eight kinds of digital values from 0 to 7 as shown in Table 1, and therefore the brightness that can be displayed in each display frame with pixels on the display panel correspondingly is available in $(8-1)=7$ degrees, but as described above, on the basis of the lower two-bit digital signal (D1, D0) delivered also from the computer 2, by selecting the display data of each display frame in a cycle of four display frame periods at either the digital value $\alpha$ or the digital value $\beta$ one smaller than this, each brightness of the seven degrees is further divided in four degrees and displayed, and supposing the state of complete absence of light emission to be a brightness of one degree, the number of gradations that can be displayed in this embodiment is $$\{(8-1)\times 4\}+1=29 \qquad (4)$$

Figure 3:
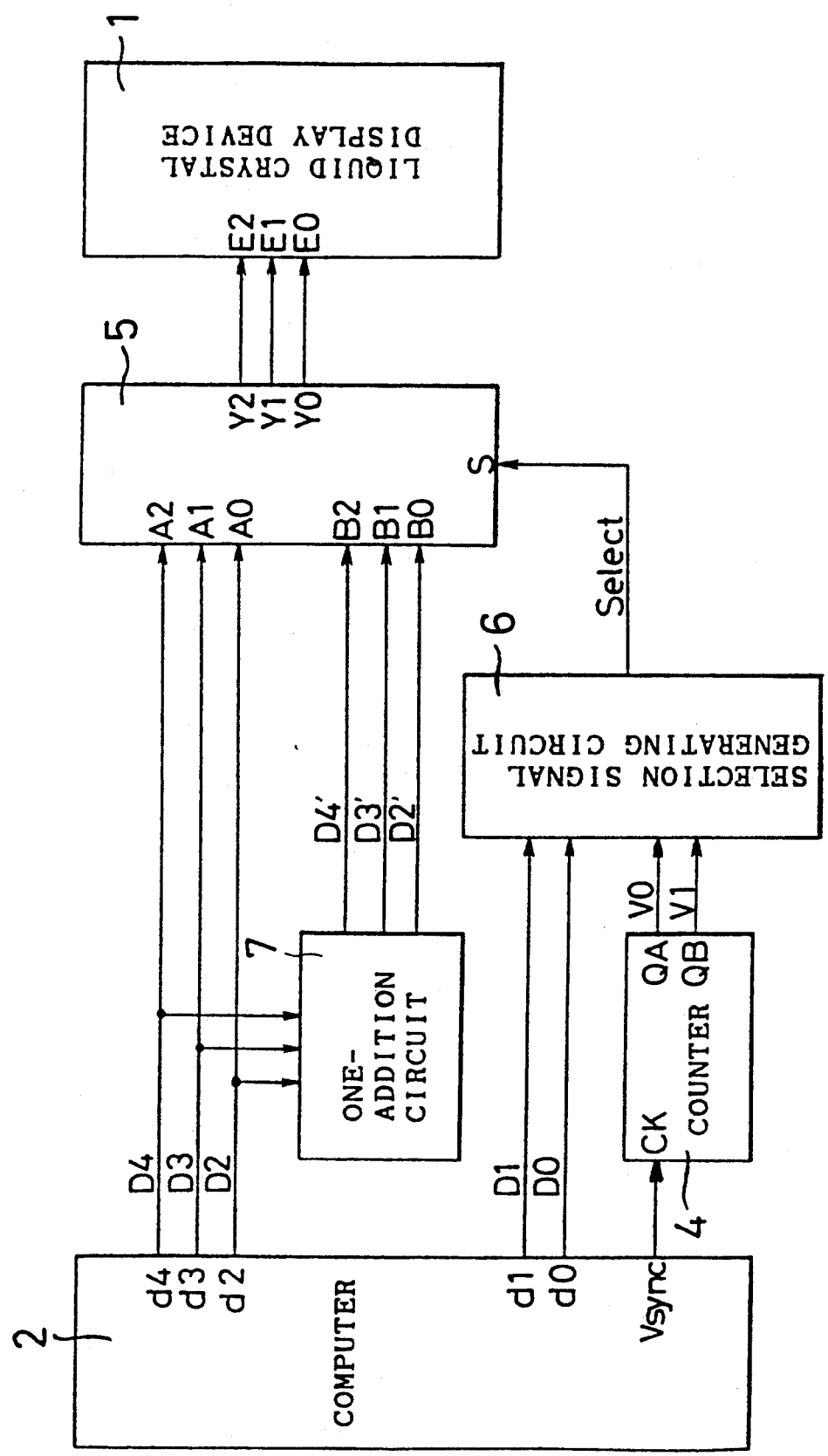
FIG. 3 is a block diagram for explaining other embodiment of the invention.

FIG. 3 is a block diagram for explaining other embodiment of the invention. A main feature of this embodiment is that the gradation display is effected at the digital value $\beta = \alpha + 1$. That is, in FIG. 3, instead of one-subtraction circuit 3 in FIG. 1, a one-addition circuit 7 is used. Therefore, the upper three-bit digital signal (D4, D3, D2) of the video signal delivered from the computer 2, and the digital output (D4', D3', D2') delivered from the one-addition circuit 7 are as shown in Table 5.

TABLE 5

| Input digital data (α value) | | | | One-added data (β value) | | | |
|---|---|---|---|---|---|---|---|
| D4 | D3 | D2 | Digital value | D4' | D3' | D2' | Digital value |
| 1 | 1 | 1 | 7 | 1 | 1 | 1 | *7 |
| 1 | 1 | 0 | 6 | 1 | 1 | 1 | 7 |
| 1 | 0 | 1 | 5 | 1 | 1 | 0 | 6 |
| 1 | 0 | 0 | 4 | 1 | 0 | 1 | 5 |
| 0 | 1 | 1 | 3 | 1 | 0 | 0 | 4 |
| 0 | 1 | 0 | 2 | 0 | 1 | 1 | 3 |
| 0 | 0 | 1 | 1 | 0 | 1 | 0 | 2 |
| 0 | 0 | 0 | 0 | 0 | 0 | 1 | 1 |

(*One-added value of 7 is also 7.)

In the data selector circuit 5, on the other hand, same as in the foregoing embodiment, in the period of the display frame when the selection signal Select given from the selection signal generating circuit 6 is "1", the digital signal (D4, D3, D2) from the computer 2 expressing the digital value α is taken in, and it is given to the liquid crystal display device 1 as display data, and in the display frame period when the selection signal Select is "0", the digital signal (D4', D3', D2') from the one-addition circuit 7 expressing digital value β is taken in, and it is given to the liquid crystal display device 1 as display data (see Table 3 and Table 5).

That is, in the liquid crystal display device 1, depending on the digital value of the lower two-bit digital signal (D1, D0) delivered from the computer 2, the display data of the digital value as shown in Table 6 is fed in each display frame.

TABLE 6

| | | | Frame No. | | | | |
|---|---|---|---|---|---|---|---|
| | | | 0 | 1 | 2 | 3 | Mean |
| D1 | D0 | 0 0 | α | β | β | β | α + 0.75 |
| | | 0 1 | α | β | α | β | α + 0.5 |
| | | 1 0 | α | α | β | α | α + 0.25 |
| | | 1 1 | α | α | α | α | α |

In the pixels of this embodiment, corresponding to the above embodiment, when the digital signal (D1, D0) expresses the digital value 2 of (1, 0), the brightness corresponding to the digital value (α+0.25) is obtained in average in one cycle. This brightness expresses the brightness one degree higher than the brightness of the digital value α, when the interval between the brightness corresponding to the digital value α and the brightness corresponding to the digital value β one more than the digital value α is divided into four degrees. It is the same in other digital values.

Besides, corresponding to the upper three-bit digital signal (D4, D3, D2) delivered from the computer 2, on the display panel, the brightness can be displayed in seven degrees, and this brightness may be further divided into four degrees on the basis of the lower two-bit digital signal (D1, D0), and supposing the state of complete light emission to be a brightness of one degree, this embodiment also realizes 29-gradation brightness display.

In the foregoing embodiments, the value added or subtracted by only one is explained, but the invention may be also realized in the gradation display system by combining three values, that is, one-added value $\alpha + 1$, one-subtracted value $\alpha - 1$, and the original value α, or In the case of using the value added or subtracted by two, three, four or the like (a positive integer) as the β value.

The invention may be embodied in other specific forms without departing from the spirit or essential characteristics thereof. the present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of driving a display device for applying digital values to pixels arranged in matrix on a display panel as corresponding display data, and illuminating the pixels at a brightness corresponding to the magnitude of the digital values to achieve gradation display, the method comprising setting plural display frame periods as one cycle, giving digital value α as display data in several display frames selectively determined within the cycle, giving digital value $\beta = \alpha \pm M$ (M being a positive integer) as display data in other display frames in the same cycle, and displaying a halftone gradation between the gradation corresponding to the digital value α and the gradation corresponding to the digital value β in plural stages corresponding to the rate of the number of display frames provided with the digital value α and the number of display frames provided with the digital value β.

2. An apparatus for driving a display device for applying digital values to pixels arranged in matrix on a display panel as corresponding display data, and illuminating the pixels at a brightness corresponding to the magnitude of the digital values to achieve gradation display, comprising:

picture signal generating means for delivering digital display data as picture display data as picture signal and vertical synchronizing signal for defining one display frame, arithmetic means for performing predetermined calculation on the digital display data from the picture signal generating means, data selecting means for applying either the display data from the picture signal generating means or the data from the arithmetic means to the display device, depending on a selection signal for specifying the digital data to be delivered in one display frame, and selection signal generating means for generating the selection signal on the basis of the vertical synchronizing signal, wherein plural display frames are set as one cycle, and display data applied to the display device from the picture signal generating means is given to the display device in several display frames selectively determined in one cycle, and the output from the arithmetic means is given to the display device in other display frames in the same cycle, the selection whether display data or output from the arithmetic means is selected being dependent upon the selection signal from said selection signal generating means that is input into said data selecting means which is determined by multiple bit signals and outputs from a counter applied by the vertical synchronizing signal.

3. An apparatus for driving a display device of claim 2, wherein the arithmetic means is means for subtracting one from the digital display data.

4. An apparatus for driving a display device of claim 2, wherein the arithmetic means is means for adding one to the digital display data.

* * * * *